(12) United States Patent
Kucmerowski

(10) Patent No.: US 7,190,778 B2
(45) Date of Patent: Mar. 13, 2007

(54) COMMUNICATION SYSTEM AND KEYSET THEREFORE CAPABLE OF IDENTIFYING SELECTED USER LOCATIONS

(75) Inventor: Dennis L. Kucmerowski, Delray Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 265 days.

(21) Appl. No.: 10/393,153

(22) Filed: Mar. 20, 2003

(65) Prior Publication Data

US 2004/0184592 A1 Sep. 23, 2004

(51) Int. Cl.
*H04M 3/42* (2006.01)
*H04M 1/00* (2006.01)

(52) U.S. Cl. .................. 379/211.01; 379/156; 379/164

(58) Field of Classification Search .......... 379/211.02, 379/211.01, 212.01, 216.01, 230, 88.11, 88.12, 379/88.17, 213.01, 265.01–265.13, 198, 379/199, 156, 164, 165

See application file for complete search history.

(56) References Cited

U.S. PATENT DOCUMENTS

| | | | | |
|---|---|---|---|---|
| 5,027,341 | A * | 6/1991 | Jarvis et al. ................ | 370/235 |
| 5,428,663 | A * | 6/1995 | Grimes et al. ............. | 340/7.21 |
| 5,822,418 | A * | 10/1998 | Yacenda et al. ....... | 379/201.07 |
| 2001/0024951 | A1* | 9/2001 | Rignell et al. | |
| 2004/0001579 | A1* | 1/2004 | Feinberg et al. | |
| 2004/0017803 | A1* | 1/2004 | Lim et al. | |

* cited by examiner

*Primary Examiner*—William J. Deane, Jr.

(57) ABSTRACT

A communications network with user presence availability and a capability of locating call forwarded users or other users. Network stations display selection of do-not-disturb (DND) at other stations, e.g., by fluttering corresponding line keys. Network stations also may selectively display call forward locations, numbers for call forwarded stations or other designated user locations that may not normally be related to call forwarding.

25 Claims, 5 Drawing Sheets

COMMUNICATION SYSTEM AND KEYSET THEREFORE CAPABLE OF IDENTIFYING SELECTED USER LOCATIONS

BACKGROUND OF THE INVENTION

1. Field of the Invention

The present invention is related to a private communications network and more particularly to locating users on a private communications network.

2. Background Description

A private communications network, e.g., a communications server or private branch exchange (PBX) server linking together telephones in a private voice network, provides users with a wide array of convenient features that extend well beyond what may be available on a normal public telephone network. Typically, the telephones are digital phones and the network is dedicated for a particular enterprise, e.g., in offices on a common campus. The digital phones may be cordless to allow some local mobility within a specific area and may be Internet protocol (IP) based for easy expansion, e.g., simply by connecting extra IP phones. Normally, each phone has its own in-network identification or extension so that, at the very least, it can be contacted by other in-network phones. Also, some or all of the network phones may have a direct inward dial (DID) number, allowing out of network parties to contact those phones directly. Local users can share both data and voice based information across the private network to improve productivity. Typical private network features include internal station to station calling, direct station connect keys, intercom/conference, call forwarding, hold, camp on, do-not-disturb, event signaling (fax, printer), speed dial and last number redial.

Occasionally, one user may try repeatedly to contact another with no success, e.g., because the other has selected do-not-disturb. One can waste precious time calling and recalling when the called party is not taking calls. Occasionally, one party may just wish to know the location/whereabouts of another person. Typically, the only way to find another's location is just to keep dialing until the other person is contacted.

Also, occasionally one user may call another's office, just to find that the call has been call forwarded to another location; a call that might not have been made if the caller had known it would be forwarded. Previously, telephone users might have been notified that a station was call forwarded, but were not shown the call forwarded location. Call forwarding status might have been provided by an indicator on the originating or call forwarded keyset and, perhaps on another monitoring keyset. Again, the only way that anyone could locate the call forwarded party was to place a call and ask whoever answered to identify the final, call forwarded destination.

Thus, there is a need for a way to determine private communications network user locations without placing calls to other users.

SUMMARY OF THE INVENTION

It is a purpose of the invention to allow telephone users to visually monitor others' availability;

It is another purpose of the invention to allow private communications network users to locate other network users without placing calls;

It is yet another purpose of the invention to allow private communications network users to determine if other network users are at their stations without placing calls to the other users;

It is yet another purpose of the invention to allow private communications network users to determine if other network users have call forwarded to other locations without placing calls to the other users.

The present invention relates to a communications network with user presence availability and a capability of locating call forwarded users or other users. Network stations display selection of do-not-disturb (DND) at other stations, e.g., by fluttering corresponding line keys. Network stations also may selectively display call forward locations, numbers for call forwarded stations or other designated user locations that may not normally be related to call forwarding.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
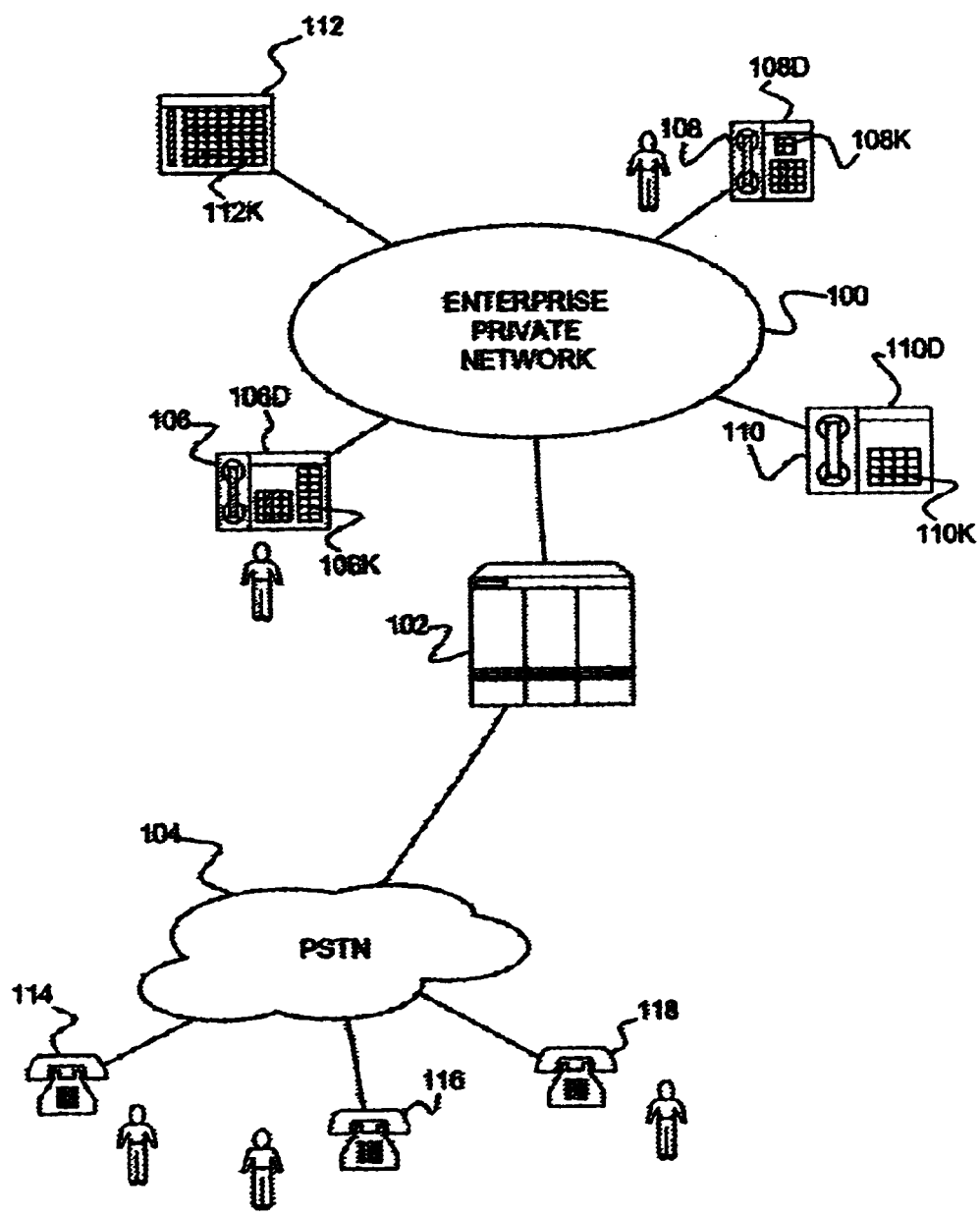
FIGS. 1A–C show examples of a preferred embodiment network with direct station select (DSS) or keyset line key features according to the present invention.
Figure 1B:
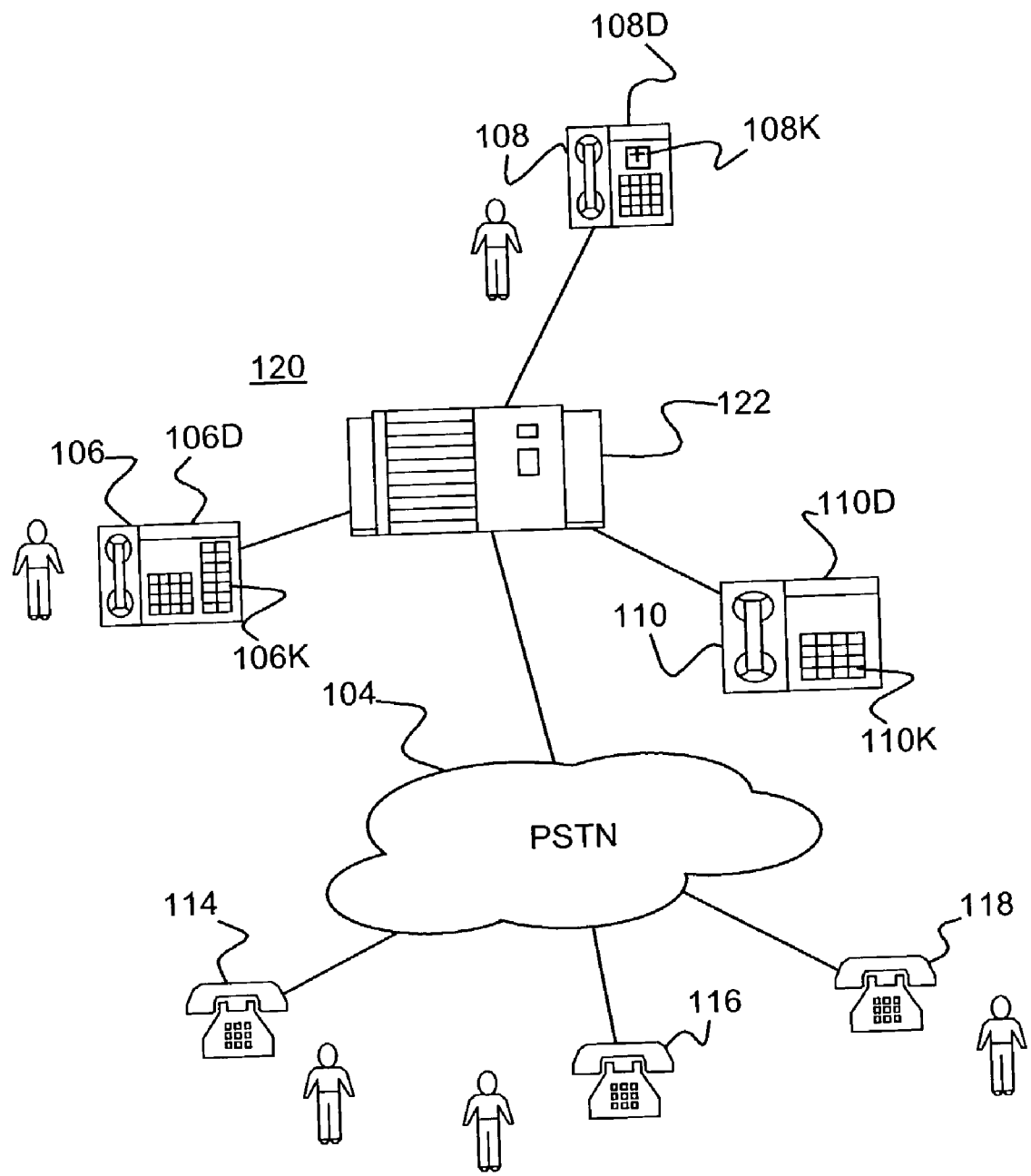
Figure 1C:
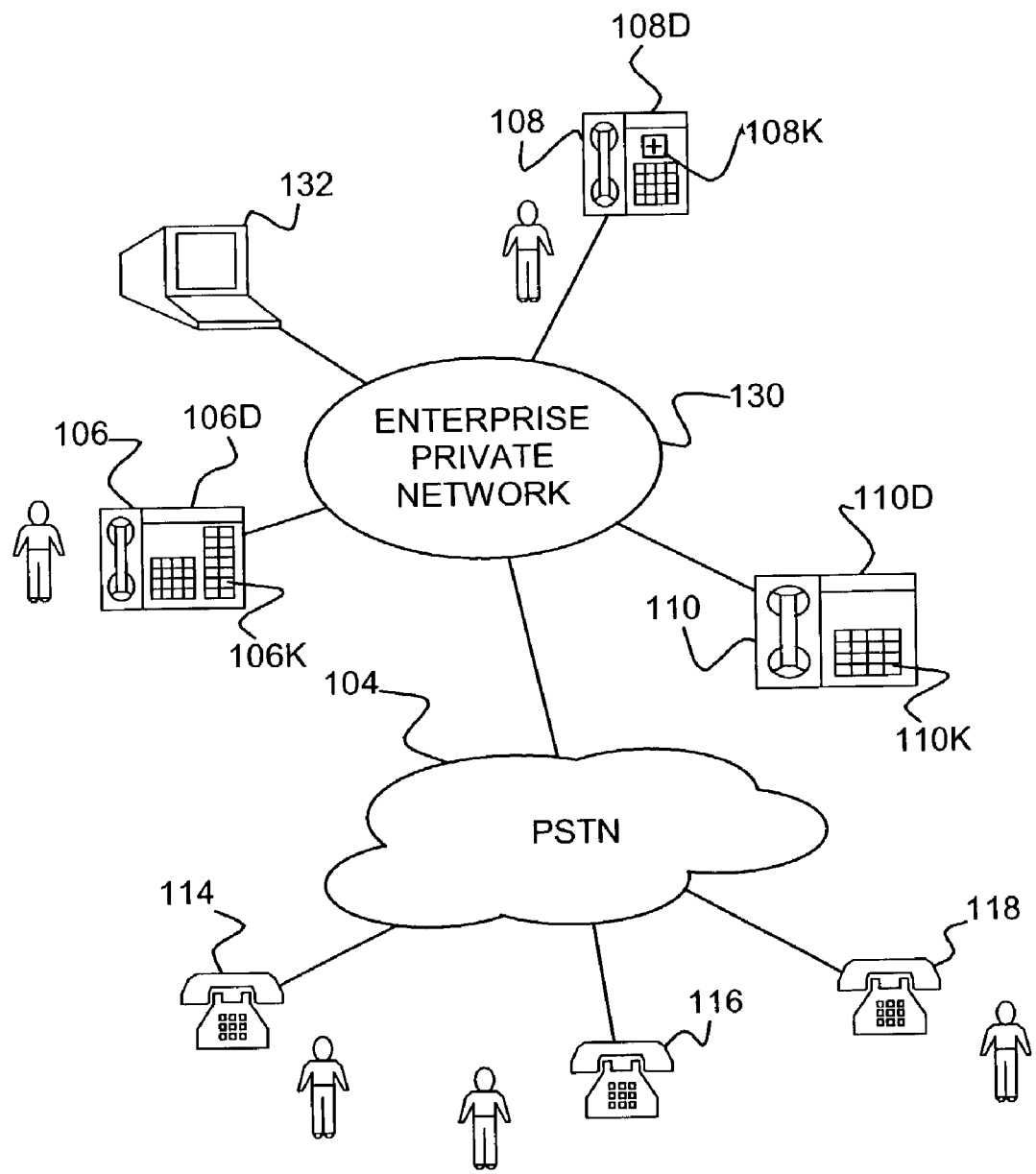

Turning now to the drawings and, more particularly, FIGS. 1A–C show examples of a preferred embodiment network with direct station select (DSS) or keyset line key features according to the present invention. The network is private communications or enterprise private network (EPN) serving a common enterprise. The private communications network may be located in a single building, contained in several buildings on a local campus or, distributed at international locations. In addition to typical telecommunications features, e.g., call forwarding, call park, camp-on, conference calling, do-not-disturb (DND), voice mail and etc., a preferred private communications network includes a "Presence-Availability" feature and a "Preview the Location" feature.

Both of these new features allow users to become more efficient by saving time and effort, locating other users before trying to make contact. So, private communications network users can preview other users' locations prior to placing a call, i.e., one user can pre-check a second user's calling station to see if the other, second user is out or at that location. If the other user is out, but has selected call forwarding, the first user can locate the call forwarding destination without calling. So, users can avoid the hit or miss approach of calling another and leaving voice mail or re-calling until reaching the other party. Instead, users can make an informed decision on the best way and time to contact other users. It is understood that either of these features can be used or included in a private communications network without requiring the use or inclusion of the other.

A preferred embodiment private communications network (100 in the example of FIG. 1A) includes a communications network server 102, e.g., a private branch exchange (PBX), or its equivalent, connected to a public switched telephone network (PSTN) 104. The communications network server 102 manages telecommunications features for individual ports or stations, which include digital communications devices 106, 108, 110. Typically, the digital communications devices 106, 108, 110 are, for example, keysets or digital phones, each of which may be wire or wirelessly connected to the private communications network 100, e.g., Wi-Fi or IEEE 802.11(b), (a) and etc. The digital phones 106, 108, 110 may include a local display, e.g., a light emitting diode (LED) display or liquid crystal display 106D, 108D, 110D, and DSS keys/keyset line keys 106K, 108K, 110K. In this example, the private communications network 100 may also include a DSS unit 112 with a suitable number of DSS keys 112K. The DSS keys/keyset line keys 106K, 108K, 110K, 112K directly select corresponding private communications network stations 106, 108, 110 and, typically, include a status indicator, e.g., a light emitting diode (LED). PSTN 104 may be the plain old telephone service (POTS) and with connected analog telephones 114, 116, 118.

A basic DSS unit 112 may sit, for example, on a receptionist's desk (not shown) allowing the receptionist to monitor private communications network stations 106, 108, 110 by the status indicator, e.g., on a corresponding key. Each status indicator indicates current call status visually for the corresponding station 106, 108, 110. In addition to line monitoring, the DSS 112 may be used to intercept incoming calls and, also, for providing a direct connect/speed dial in addition to the corresponding station 106, 108, 110.

According to a preferred embodiment of the present invention, whenever a station is not receiving calls and so, in an unavailable state, e.g., by activating/selecting DND, that unavailability may be indicated to other users. The communications network server (PBX 102) upon receiving an unavailable indication from a station, updates corresponding indicator 106K, 108K, 110K, 112K to indicate that station's current state, e.g., Presence-Unavailable. Other telephone users can view the presence status indication (e.g., on the DSS/Line key indicators) to decide how they wish to proceed, i.e., whether to contact the unavailable user some other way. When the DND condition is reset or removed, the PBX 102 updates the DSS and Line key indicators for that station to indicate the state change, e.g., the Presence-Available state.

FIG. 1B shows another example of a preferred embodiment private communications network 120 wherein instead of the DSS unit 112 and PBX 102 of FIG. 1, a key system unit (KSU) 122 acts as communications network server to provide the DSS/keyset line key features according to the present invention. Also in this example, keyset line keys, e.g., 106K, 108K, 110K on keysets 106, 108, 110 provide call status indication substantially identically to FIG. 1.

FIG. 1C shows yet another example of a preferred embodiment private communications network 130 wherein, the DSS/keyset line key control of the communications network server is provided in software. The status indication may be provided on the keyset keys 106K, 108K, 110K, the local LCD display 106D, 108D, 110D or, graphically through a graphical user interface (GUI) on the terminal 132, which may be a computer display or personal computer (PC) monitor. Further, users of digital phones without DSS/keyset line indicators (not shown) may simply enter a number on the keyset keypad without placing a call; and, the Presence-Available indication may simply be displayed, e.g., on a local LCD display 106D, 108D, 110D. Also, although described herein with reference to a private communications network, the present invention has application to both the public and private communications networks with DSS key/keyset line key capability.

Preferably, DND is indicated on the DSS keys and line keys 106K, 108K, 110K, 112K with other available DSS signals or Keyset Line Keys features to provide the user a quick indication of other users presence at pre-selected stations. Normally, when someone selects DND, e.g., by pressing a do-not-disturb key or by dialing a corresponding access code, incoming calls may be routed directly to voice mail or, simply, the phone will not ring at that station even though the caller may hear it ringing. Prior art systems do not provide an indication of whether or not DND has been selected by a remote user and, as far as anyone can tell, the particular user at the called station is away. In a preferred embodiment system, however, DND is reflected on the corresponding DSS key. So, for example, if the station being monitored is idle or on-hook, then, the DSS indication (the LED) is off or dark; if the monitored station is off-hook or busy, then, the DSS indication is on; if the station is on hold, then the DSS indication is blinking at one rate, e.g., at 120 interrupts per minute (ipm); otherwise, if the station being monitored is ringing, then the DSS indication blinks with the ringing or at a slower rate, e.g., 60 ipm. In addition however, when a user at one of the pre-selected stations indicates they do not wish to be reached e.g., by pressing the do-not-disturb key or by dialing an appropriate access code the corresponding associated DSS key indicates the selection at the associated LED, e.g., the DSS indication is fluttering by blinking the LED at a visible but rapid rate, e.g., 600 ipm.

Figure 2A:
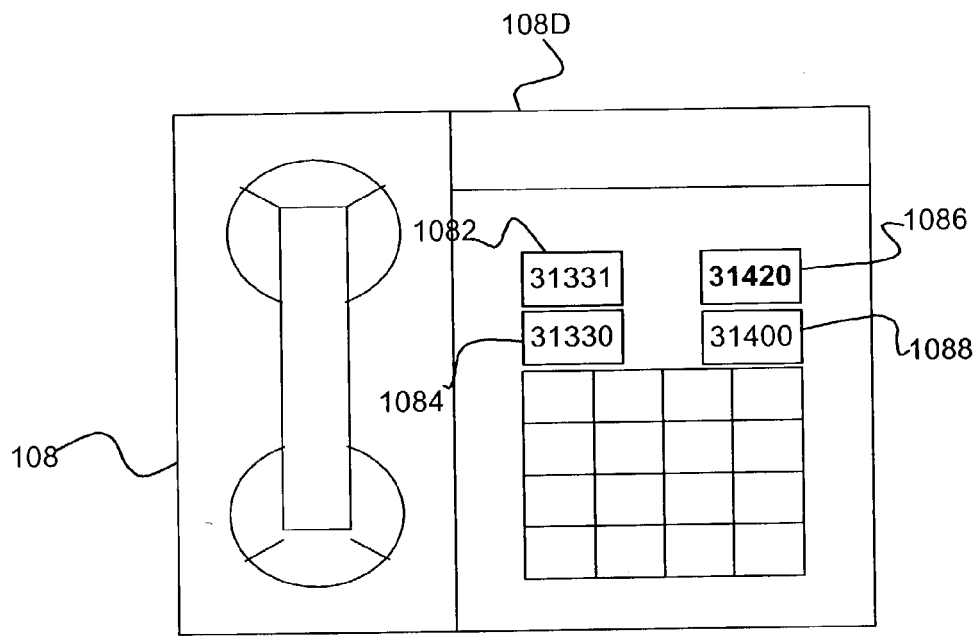
FIG. 2A shows an example of typical preferred embodiment keyset with the Presence-Availability feature of the present invention.

FIG. 2A shows an example of typical keyset for a preferred embodiment communications network with the Presence-Availability feature of the present invention, e.g., keyset 108 in FIGS. 1A–C. In this example, keyset 108 includes four (4) keyset line keys/indicators 1082, 1084, 1086, 1088. So, for example, two keys 1082, 1084 may be DSS keys, e.g., for users named Kate at keyset 106 and Mark at another keyset, e.g., virtual keyset PC 132 in FIG. 1C, while one key 1086 is a line appearance key (e.g., for a user named Betty at keyset 110) and the fourth key 1088 is a line key (for a user named Jim) for this keyset 108. So for example, if Betty selects DND on her telephone 110 to place her station at extension 31420 in Do-Not-Disturb (unavailable), line key 1088 on Jim's telephone indicates that Betty has DND active and so, is unavailable. Optionally, unavailability is assigned the lowest priority at the originating telephone (in this example at Betty's) where the unavailable status is initiated. If assigned lowest priority, the unavailable status indication is displayed at the originating station only when that line is not experiencing other activity, e.g., ringing, busy, hold, while other keysets 106, 108, 132 continue to indicate that the originating keyset is unavailable.

At a glance a user can determine prior to initiating a telephone call whether whomever they wish to contact is available or does not wish to be disturbed. Also, as noted above the Presence-Availability indication may be provided to a keyset LCD display, e.g., 108D. The keyset user may simply key in the number to request presence, followed by the station for which the user wishes to display presence and, then, decide whether to place the call. So, whenever one user wants to contact another, the user can determine whether the other user is available or even wishes to be contacted (i.e., is unavailable) using the Presence-Availability feature. Otherwise, without the Presence-Availability feature, telephone users must call and recall the person just to contact the person and is unaware when the person does not wish to be disturbed.

Figure 2B:
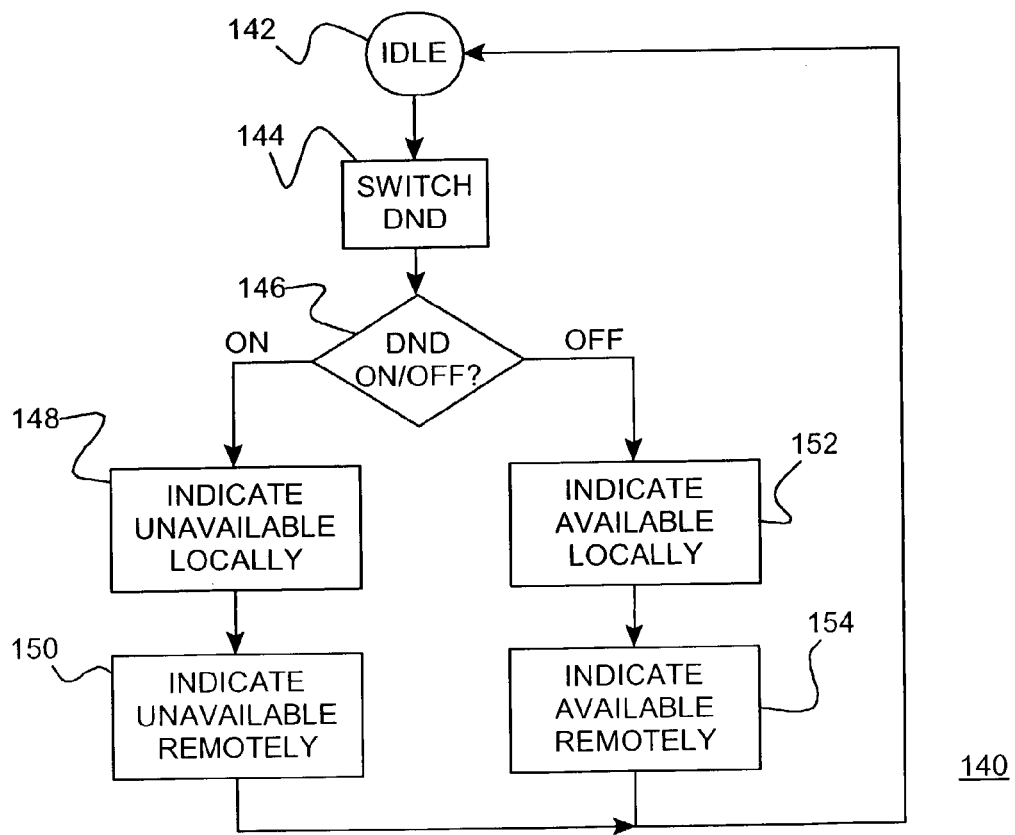
FIG. 2B shows an example of a flow diagram showing how the DND status indication is indicated in a preferred embodiment system.

FIG. 2B shows a flow diagram 140 of an example of how DND status is indicated to other users in a preferred embodiment system. Although DND may be selected during a call, normally, the particular line is idle in step 142 and so, available. In step 144 the DND state is switched, i.e., selected. When in step 146 it is determined that DND is active for a selected line, that line becomes unavailable. In step 148, the originating telephone (that activated DND) indicates that the line is unavailable. In step 150 the indication that the line is unavailable is distributed to all telephones in the network with a line key or indicator, indicating that the originating telephone has activated DND, e.g., fluttering the line key LED associated with the DND line and the station returns to idle in step 142. In step 144 when DND switches, i.e., is terminated, then in step 152, the originating telephone (that terminated DND) indicates that the line is available. In step 154, the indication that the line is available is distributed to all telephones in the network with the line key or indicator, e.g., no longer fluttering the line key LED associated with the DND line. Again the station returns to idle in step 142.

Thus, using the Presence-Availability feature a user can quickly determine whether another user is in the office or out. So, one user can determine whether that user is currently taking calls at that location. If that other user has selected DND, the first user does not waste time in pointless attempts to redial. If, however, calls are forwarded and the other user is not in, the first user can use the "Preview the Location" feature to identify the call forwarded user's location. Thus, the user can determine, whether the other user is nearby or at some distant or off site location.

Figure 3A:
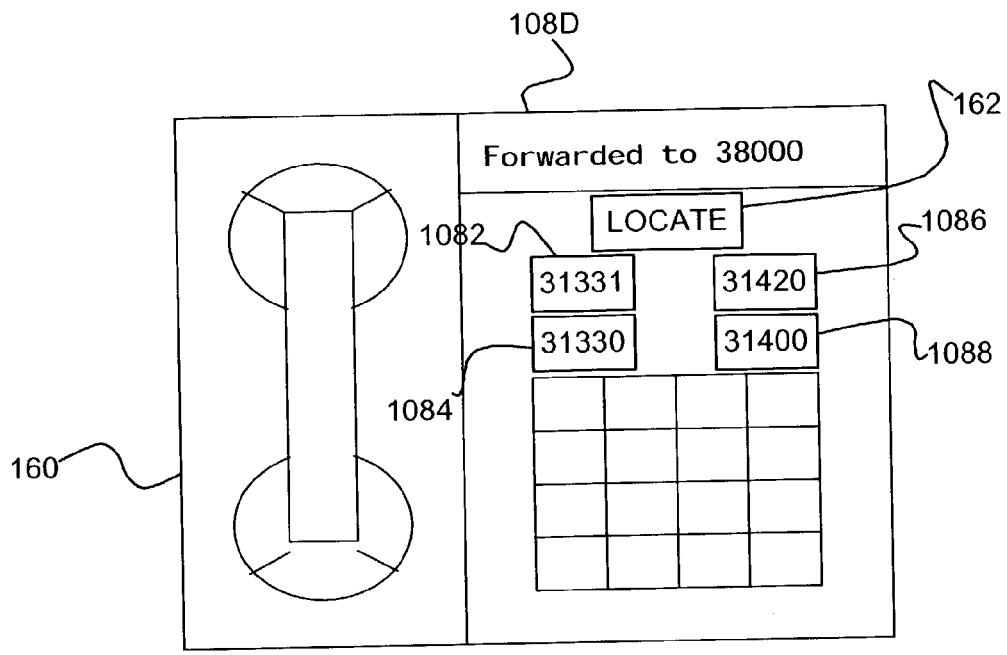
FIG. 3A shows an example of typical preferred embodiment keyset with a "Preview The Location" feature of the present invention.

FIG. 3A shows an example of typical preferred embodiment keyset 160 with the "Preview The Location" or locate feature of the present invention, which may be included independent of whether the above Presence-Availability feature is included. In this example, the keyset 160, which is substantially similar to the keyset 108 of FIG. 2A with like elements labeled identically, includes a "Preview The Location" key or locate button 162, that facilitates locating call forwarded users. Further in this example, the call forwarded destination is displayed in display 108D without ever placing a call. Thus, once the station user locates another user, based on the location the station user can decide whether to place the call or use some other more appropriate contact method.

So, continuing the above system example, Kate at keyset 106 call forwards extension 31331 to 38000. Call forwarding is not indicated anywhere, except perhaps at keyset 106, until keyset 106 is selected for preview. When, someone (Jim at telephone 160) selects the locate key 162 in combination with Kate's line key 1082, a message displays in display 108D indicating that Kate is call forwarded to 38000. The selection sequence of pressing locate key 162 with a line key 1082, 1084 or 1086 (line key 1088 is the indicator for the keyset 160), whether before, after or coincidentally, is determined by the particular system. Further, although shown on display 108D, this is for example only and the indication of whether the selection is forwarded is determined by the keyset design and/or the particular system. Other suitable indications include fluttering a corresponding LED in line key 1082, e.g., when an alphanumeric display is not readily available or, an audible or verbal announcement. The forwarded destination may be changed, either locally (e.g., at Kate's keyset) or remotely, e.g., by calling into the PBX 102 or KSU 122 and providing a new call forward number or, by entering the information in a software interface on a computer terminal 132. Whenever the call forwarding destination is changed, the new forwarded destination is indicated. When call forwarding is cancelled, the keyset 108 no longer indicates anything other than "Present" (or perhaps DND) in display 108D, by beeping or simply by flashing the line key LED.

Figure 3B:
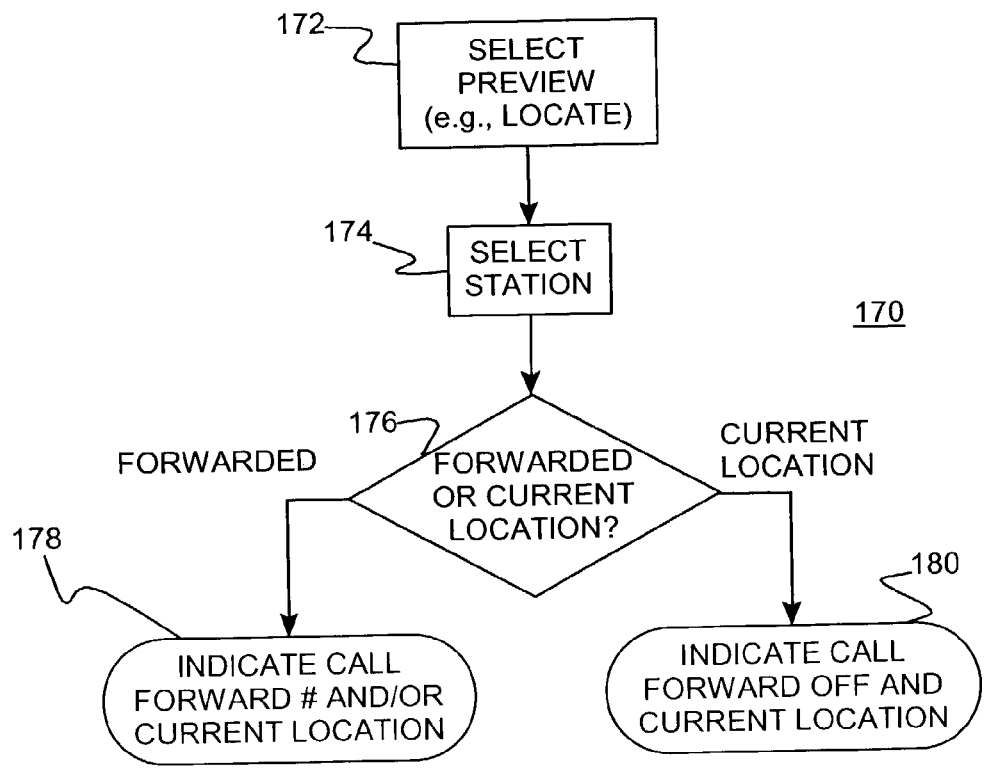
FIG. 3B shows an example of a flow chart showing how users locate call forwarded users.

As shown in FIG. 3B which shows an example of flow chart 170 how users are at least provided the call forwarded number to locate call forwarded users. First, in step 172 the preview location feature is selected, e.g., by pressing key 162 on keyset 160. Then, in step 174, one of the available extensions is selected. In step 176, the PBX (102 in FIG. 1A), the KSU (122 in FIG. 1B) or an equivalent determines whether the selected location is call forwarded. If so, in step 178 the call forwarded information (and/or location) is displayed, e.g., in LCD display 108D. Further, if a name is associated with the call forwarded number, e.g., "Phil's Office" or the Ritz hotel, that name may be displayed providing additional assistance in locating the call forwarded user. If call forwarding has not been set for the selected station, that is indicated in step 180. So, for example, the display 108D may indicate call forward information (e.g., 31770 Conference Room A) or, if forwarding is not set, the display 108D may provide a location where the user could be reached, e.g., at home, gym, out of office.

Advantageously, by supplementing telecommunications features normally found in any state of the art private communications network, a preferred embodiment private communications network improves user efficiency and on occasion, may save users considerable time. Users save time because one user can locate another and, based upon that location, decide when, where and how to contact that other user. Using the Presence-Availability feature users can quickly determine whether that user is currently taking calls at that location. If that other user has selected DND, time is not wasted in pointless attempts to redial. The Preview the Location feature allows users to determine when another user has call forwarded or is at another location and so, is not at the user's private communications network station, where the other user may be, e.g., nearby or at some distant or off site location. On those occasions that calls are forwarded, indicating that the other user is not in, the first user is provided with call forwarded user's location. It is understood that either of these features can be used or included in a private communications network without requiring the use or inclusion of the other.

While the invention has been described in terms of preferred embodiments, those skilled in the art will recognize that the invention can be practiced with modification within the spirit and scope of the appended claims.

What is claimed is:

1. A communications network comprising:
   a communications network server serving a plurality of communications stations, each of said plurality of communications stations having a unique network identification (iD);
   a plurality of communications devices located at ones of said plurality of communications stations;
   at least one of said plurality of communications devices having at least one line indicator indicating status of a corresponding other station, indicated status including said corresponding other station being in a do-not-disturb (DND) state; and at least one other of said plurality of communications devices comprising a display and a keypad, call status for each other one of said plurality of communications devices being displayed in said display responsive to entering a corresponding said unique ID in said keypad, said at least one other selectively remaining disconnected.

2. A communications network as in claim 1, wherein said communications network is a private communications networks, said communications network server is a private branch exchange (PBX) connecting said private communications network to a public network and a status priority may be assigned for each indicated status for each of said plurality of communications devices, wherein when said availability status priority is assigned a lowest priority for another, status is indicated only when said other is experiencing other activity.

3. A communications network as in claim 1, wherein said communications network is a private communications network, said communications network server is a key system unit (KSU) connecting said private communications network to a public network and a status priority may be assigned for each indicated status for each of said plurality of communications devices, wherein when said availability status priority is assigned a lowest priority for another, status is indicated only when said other is experiencing other activity.

4. A communications network as in claim 1, wherein said at least one of said plurality of communications devices is a plurality of keysets, each of said plurality of keysets having a plurality of line indicators each indicating status of a corresponding other station, each said corresponding other station capable of being placed in said DND state, any said corresponding other station in said DND state being indicated on said plurality of line indicators.

5. A communications network as in claim 1, wherein said display is a liquid crystal display.

6. A communications network as in claim 1, wherein said line indicator is in a graphical user interface (GUI), displayed on a computer terminal.

7. A communications network as in claim 1, wherein at least one of said plurality of communications devices is a direct station select (DSS) unit with a plurality of line indicators each indicating status of a corresponding other station, ones of said plurality of communications devices capable of being placed in said DND state, any said corresponding other station in said DND state being indicated on said plurality of line indicators.

8. A communications network as in claim 1, wherein each said line indicator indicates said corresponding station is in said DND state without entering said ID for said corresponding station.

9. A communications network as in claim 1, wherein said at least one line indicator is in a line key, said line key selecting connection to said corresponding station, said line key flickering at a selected rate to indicate selection of DND.

10. A communications network comprising:
a communications network server serving a plurality of communications stations, each of said plurality of communications stations having a unique network identification (ID);
a plurality of communications devices located at ones of said plurality of communications stations; and
at least one of said plurality of communications devices having an indicator indicating a call forwarded location when a selected other one of said plurality of communications station is call forwarded.

11. A communications network as in claim 10, wherein said communications network is a private communications network and said communications network server is a private branch exchange (PBX) connecting said private communications network to a public network.

12. A communications network as in claim 10, wherein said communications network is a private communications network and said communications network server is a key system unit (KSU) connecting said private communications network to a public network.

13. A communications network as in claim 10, wherein said at least one of said plurality of communications devices is a plurality of keysets, each of said plurality of keysets a key selecting call forwarding location identification.

14. A communications network as in claim 13, wherein said indicator on ones of said plurality of keysets is a liquid crystal display.

15. A communications network as in claim 10, wherein said indicator is in a graphical user interface (GUI), displayed on a computer terminal.

16. A communications network as in claim 10, wherein at least one of said plurality of communications devices is a direct station select (DSS) unit with a liquid crystal display.

17. A communications network as in claim 10, wherein at least one of said plurality of communications devices is a digital telephone with direct station select (DSS) keys.

18. A keyset for a communications network, said keyset comprising:
a keypad for dialing extensions and phone numbers;
a plurality of line keys for monitoring corresponding connected stations and connecting directly to said corresponding connected stations;
a display displaying call status; and
a location preview key for selecting a connected station, said display displaying call forwarded information for a selected said connected station.

19. A keyset as in claim 18, wherein said displayed call forwarded information is an alphanumeric identification of a call forwarded location.

20. A keyset as in claim 19, wherein said displayed location is a call forward number.

21. A keyset as in claim 18, wherein said displayed call forwarded information is an alphanumeric identification of a designated location where a user associated with said connected station may be located.

22. A method of locating users of a private communications network, said method comprising the steps of:
a) selecting a locate function on a private communications network station;
b) selecting a station identification for a corresponding user; and
c) displaying locational information for said private communications network station corresponding user.

23. A method of locating users as in claim 22, wherein the displaying step (c) displays a call forwarded location identification.

24. A method of locating users as in claim 23, wherein said call forwarded location identification is a call forwarded number.

25. A method of locating users as in claim 22, wherein the displaying step (c) displays a designated location where said private communications network station corresponding user may be located.

* * * * *